(12) United States Patent
Sweet, III et al.

(10) Patent No.: US 9,258,462 B2
(45) Date of Patent: Feb. 9, 2016

(54) CAMERA GUIDED WEB BROWSING BASED ON PASSIVE OBJECT DETECTION

(75) Inventors: Charles Wheeler Sweet, III, San Diego, CA (US); Qi Xue, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 436 days.

(21) Appl. No.: 13/450,312

(22) Filed: Apr. 18, 2012

(65) Prior Publication Data

US 2013/0278777 A1 Oct. 24, 2013

(51) Int. Cl.
*H04N 5/225* (2006.01)
*G06F 17/30* (2006.01)

(52) U.S. Cl.
CPC .......... *H04N 5/225* (2013.01); *G06F 17/30247* (2013.01); *G06F 17/30905* (2013.01)

(58) Field of Classification Search
CPC .. H04N 5/225; H04N 5/232; G06F 17/30905; G06F 17/30247; G01S 3/7864; G01S 3/7865
USPC ........................................................ 348/169
See application file for complete search history.

(56) References Cited

U.S. PATENT DOCUMENTS

| | | | | |
|---|---|---|---|---|
| 6,067,114 A * | 5/2000 | Omata | ............... | H04N 5/23212 348/345 |
| 7,809,802 B2 | 10/2010 | Lerman et al. | | |
| 7,962,128 B2 | 6/2011 | Neven et al. | | |
| 8,010,279 B2 | 8/2011 | Kobuya et al. | | |
| 8,024,359 B2 | 9/2011 | Rathus et al. | | |
| 8,060,589 B1 * | 11/2011 | Kao | ...................... | H04L 67/125 709/201 |
| 8,971,571 B1 * | 3/2015 | Starner | .................... | G06K 9/00 382/103 |
| 2001/0014973 A1 * | 8/2001 | Suzuki | ................. | G11B 27/034 725/88 |
| 2001/0052110 A1 * | 12/2001 | Orbanes | .............. | G06F 3/04815 717/100 |
| 2002/0024640 A1 * | 2/2002 | Ioka | ....................... | G03B 21/13 353/94 |
| 2002/0075307 A1 * | 6/2002 | Alexander | ............. | H04L 29/06 715/760 |
| 2002/0105578 A1 * | 8/2002 | Hunter | ............. | G08B 13/19606 348/169 |
| 2003/0026390 A1 * | 2/2003 | Lutz | ........................ | G06T 5/002 378/210 |
| 2004/0054670 A1 * | 3/2004 | Noff | ...................... | G06F 17/218 |
| 2004/0127785 A1 * | 7/2004 | Davidson | ............... | A61B 5/073 600/407 |
| 2008/0086511 A1 * | 4/2008 | Takao | ............... | G06F 17/30265 |
| 2008/0101784 A1 * | 5/2008 | Hsu | ........................ | G03B 13/18 396/89 |
| 2008/0129825 A1 * | 6/2008 | DeAngelis | ......... | A63B 24/0021 348/169 |
| 2009/0059270 A1 * | 3/2009 | Opalach | ............... | G06Q 10/087 358/1.15 |

(Continued)

OTHER PUBLICATIONS

International Search Report and Written Opinion—PCT/US2013/027941—ISAEPO—Jan. 13, 2014.

(Continued)

*Primary Examiner* — Jay Patel
*Assistant Examiner* — Joseph Suh
(74) *Attorney, Agent, or Firm* — Hunter Clark PLLC (57) ABSTRACT

Systems and methods for performing camera-guided browsing, such as web browsing, are described herein. A method for operating a camera-guided web browser as provided herein includes displaying a web page on a display associated with a portable device; passively detecting a first object within a field of view of a camera associated with the portable device; and altering at least part of the web page with first content associated with the first object in response to passively detecting the first object within the field of view of the camera.

35 Claims, 7 Drawing Sheets

(56) References Cited

U.S. PATENT DOCUMENTS

| | | | |
|---|---|---|---|
| 2009/0063306 A1* | 3/2009 | Fano | G06K 9/00 705/28 |
| 2009/0141019 A1* | 6/2009 | Lobko | G06K 9/00 345/419 |
| 2009/0204511 A1 | 8/2009 | Tsang | |
| 2009/0285444 A1* | 11/2009 | Erol | G06F 17/30253 382/100 |
| 2010/0039513 A1* | 2/2010 | Glickman | G06K 9/00 348/143 |
| 2010/0046798 A1* | 2/2010 | Miyazaki | G06T 7/204 382/103 |
| 2010/0134614 A1* | 6/2010 | Aman | A63B 24/0003 348/135 |
| 2010/0304858 A1* | 12/2010 | Asuke | A63F 13/10 463/31 |
| 2011/0212717 A1* | 9/2011 | Rhoads | G06F 17/30241 455/420 |
| 2011/0234838 A1* | 9/2011 | Naganuma | G06T 13/80 348/222.1 |
| 2012/0062732 A1* | 3/2012 | Marman | H04N 7/18 348/142 |
| 2012/0177248 A1* | 7/2012 | Shuster | H04L 63/0407 382/100 |
| 2013/0110565 A1* | 5/2013 | Means, Jr. | G06Q 10/063 705/7.11 |
| 2014/0135069 A1* | 5/2014 | Jung | G06F 3/041 455/566 |
| 2015/0070347 A1* | 3/2015 | Hofmann | G06K 9/00208 345/419 |

OTHER PUBLICATIONS

Shi Y., et al., "GestureCam: A Smart Camera for Gesture Recognition and Gesture-Controlled Web Navigation", Control, Automation, Robotics and Vision, 2006, ICARCV 06, 9th International Conference on, IEEE, PI, Dec. 5, 2006, pp. 1-6, XP031334041, DOI: 10.1109/ICARCV.2006.345226, ISBN: 978-1-4244-0341-7.

Written Opinion of the International Preliminary Examining Authority—PCT/US2013/027941—IPEA/EPO—Aug. 6, 2014, 7 pgs.

Wikipedia, "QR code," Retrieved from http://en.wikipedia.org/wiki/QR_code on Apr. 18, 2012.

International Preliminary Report on Patentability—PCT/US2013/027941, The International Bureau of WIPO—Geneva, Switzerland, Sep. 26, 2014, 8 pgs.

* cited by examiner

CAMERA GUIDED WEB BROWSING BASED ON PASSIVE OBJECT DETECTION

BACKGROUND

Advancements in wireless communication technology have greatly increased the versatility of today's wireless communication devices. These advancements have enabled wireless communication devices to evolve from simple mobile telephones and pagers into sophisticated computing devices capable of a wide variety of functionality such as multimedia recording and playback, event scheduling, word processing, e-commerce, etc. As a result, users of today's wireless communication devices are able to perform a wide range of tasks from a single, portable device that conventionally required either multiple devices or larger, non-portable equipment.

For instance, many modern wireless communication devices utilize web browsers in order to enable users to access and traverse content located on the World Wide Web. Web browsers generally provide access to content in the form of web pages, which consist of content typically accessed over a network and defined by a markup language such as Hypertext Markup Language (HTML) or the like. As mobile communication devices vary in terms of form factor and available input devices, mobile web browsers are generally designed for specific devices or classes of devices (e.g., smartphones, tablet or laptop computers, personal digital assistants (PDAs), etc.) having similar form factor and input functionality. For instance, various mobile web browsers facilitate navigation via a touch screen or numeric keypad of the associated mobile device. Various other mobile web browsers facilitate navigation to a specific location (e.g., website or web page) by capturing a coded image, such as a bar code or QR (quick response) code, using a camera of the associated mobile device.

Various wireless communication devices additionally or alternatively utilize augmented reality (AR) applications to present a user with information relating to his or her surroundings. Generally, a camera of a mobile device running an AR application captures imagery of the surroundings of the mobile device. This live imagery is then displayed substantially in real time along with augmentations (e.g., graphics or other information) superimposed on the imagery. For instance, an AR application may be configured to detect one or more objects within view of the camera, retrieve information associated with the object(s), and superimpose the retrieved information on a display showing a live view of the camera imagery as augmentations proximate to the corresponding object(s).

SUMMARY

An example of a method for operating a camera-guided web browser is described herein. The method includes displaying a web page on a display associated with a portable device; passively detecting a first object within a field of view of a camera associated with the portable device; and altering at least part of the web page with first content associated with the first object in response to passively detecting the first object within the field of view of the camera.

Implementations of the method may include one or more of the following features. The first content includes content distinct from imagery captured by the camera. Displaying the web page using a web browser application. Passively detecting the first object using an object recognition engine. The object recognition engine is implemented as a computer vision plug-in of the web browser application. The object recognition engine is implemented as an embedded component of the web browser application. Altering one or more frames associated with the web page using the first content. Displaying at least one static content section and at least one dynamic content section of the web page; passively and automatically capturing at least one image using the camera and identifying the first object within the at least one image; and obtaining the first content, the first content including dynamic web page content associated with the first object, and displaying the first content within the at least one dynamic content section of the web page. Passively and automatically capturing the at least one image includes capturing a plurality of images according to a sample rate. Obtaining an indication that the web page supports camera-guided browsing and activating the camera in response to the indication. Passively detecting a second object within the field of view of the camera and altering at least part of the web page with second content associated with the second object in response to passively detecting the second object within the field of view of the camera. Replacing the first content with the second content. Displaying the second content in addition to the first content.

An example of a system for operating a web browser is described herein. The system includes a portable communications device including a display screen and a camera; a web browser associated with the portable communications device and configured to display a web page on the display screen of the portable communications device; and an object recognition engine associated with the web browser, communicatively coupled to the camera, and configured to passively detect a first object within a field of view of the camera. The web browser is further configured to alter at least part of the web page as displayed on the display screen with first content associated with the first object in response to passive detection of the first object by the object recognition engine.

Implementations of the system may include one or more of the following features. The first content includes content distinct from imagery captured by the camera. The object recognition engine includes a plug-in of the web browser. The object recognition engine is an embedded component of the web browser. The web browser is configured to alter one or more frames associated with the web page with the first content. The web browser is configured to display at least one static content section and at least one dynamic content section of the web page on the display screen; the object recognition engine is configured to instruct the camera to passively and automatically capture at least one image and to identify the first object within the at least one image; and the web browser is further configured, in response to the object recognition engine, to obtain the first content, the first content including dynamic web page content associated with the first object, and to display the first content on the display screen within the at least one dynamic content section of the web page. The object recognition engine is further configured to passively detect a second object within the field of view of the camera; and the web browser is further configured to alter at least part of the web page with second content associated with the second object in response to passively detecting the second object within the field of view of the camera. The web browser is further configured to replace the first content with the second content. The web browser is further configured to display the second content in addition to the first content. The web browser is further configured to obtain an indication that the web page supports camera-guided browsing and to activate the camera in response to the indication. The portable communications device includes a smartphone.

An example of a system for operating a camera-guided web browser is described herein. The system includes a portable device having a camera and a display screen; static display means, communicatively coupled to the portable device, for displaying a web page at the display screen of the portable device; computer vision means, communicatively coupled to the camera, for passively detecting a first object within a field of view of the camera; and dynamic display means, communicatively coupled to the static display means and the computer vision means, for altering at least part of the web page with first content associated with the first object in response to passively detecting the first object via the computer vision means.

Implementations of the system may include one or more of the following features. The first content includes content distinct from imagery captured by the camera. Means for altering one or more frames associated with the web page using the first content. Means for partitioning the web page into one static content section and at least one dynamic content section, means for instructing the camera to passively and automatically capture at least one image, means for identifying the first object within the at least one image, means for obtaining the first content, the first content including dynamic web page content associated with the first object, and means for displaying the first content within the at least one dynamic content section of the web page. Control means, communicatively coupled to the camera, for obtaining an indication that the web page supports camera-guided browsing and activating the camera in response to the indication. Means for passively detecting a second object within the field of view of the camera and means for altering at least part of the web page with second content associated with the second object in response to passively detecting the second object within the field of view of the camera.

An example of a computer program product described herein resides on a processor-executable computer storage medium and includes processor-executable instructions configured to cause a processor to display a web page on a display screen associated with a portable device; passively detect a first object within a field of view of a camera associated with the portable device; and alter at least part of the web page with first content associated with the first object in response to passively detecting the first object within the field of view of the camera.

Implementations of the computer program product may include one or more of the following features. The first content includes content distinct from imagery captured by the camera. Instructions configured to cause the processor to alter content within one or more frames associated with the web page. Instructions configured to cause the processor to display at least one static content section and at least one dynamic content section of the web page; instructions configured to cause the processor to passively and automatically capture at least one image using the camera and to identify an object within the at least one image; and instructions configured to cause the processor to obtain the first content, the first content including dynamic web page content associated with the first object, and to display the first content within the at least one dynamic content section of the web page. Instructions configured to cause the processor to obtain an indication that the web page supports camera-guided browsing and to activate the camera in response to the indication. Instructions configured to cause the processor to passively detect a second object within the field of view of the camera and to alter at least part of the web page with second content associated with the second object in response to passively detecting the second object within the field of view of the camera.

Items and/or techniques described herein may provide one or more of the following capabilities, as well as other capabilities not mentioned. By incorporating computer vision detection and object recognition into a web navigation application, such as a web browser, the application can be made more usable and intuitive. A simple, user-friendly control mechanism can be provided to enable a user to navigate to context-specific information relating to an object at which the user is looking. A camera-guided browsing experience can be provided to allow content associated with one or more network locations to be traversed in a seamless manner without additional applications and with reduced user input. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Described herein are systems and methods for camera-aided operation of a content navigation application, such as a web browser. A user of a mobile device or other device associated with a camera runs a web browser application on the device while directing the camera to an area surrounding the device. Based on objects detected within view of the camera, content displayed within the web browser is dynamically altered. In doing so, content relevant to an area at which the user is looking is presented to the user without the user manually navigating to the content, either within the browser application itself or secondary standalone applications.

Systems and methods described herein operate via one or more mobile devices 12. These mobile devices include, but are not limited to, personal digital assistants (PDAs), smartphones, computing devices such as laptops, desktops or tablet computers, automobile computing systems, etc., whether presently existing or developed in the future.

Figure 1:
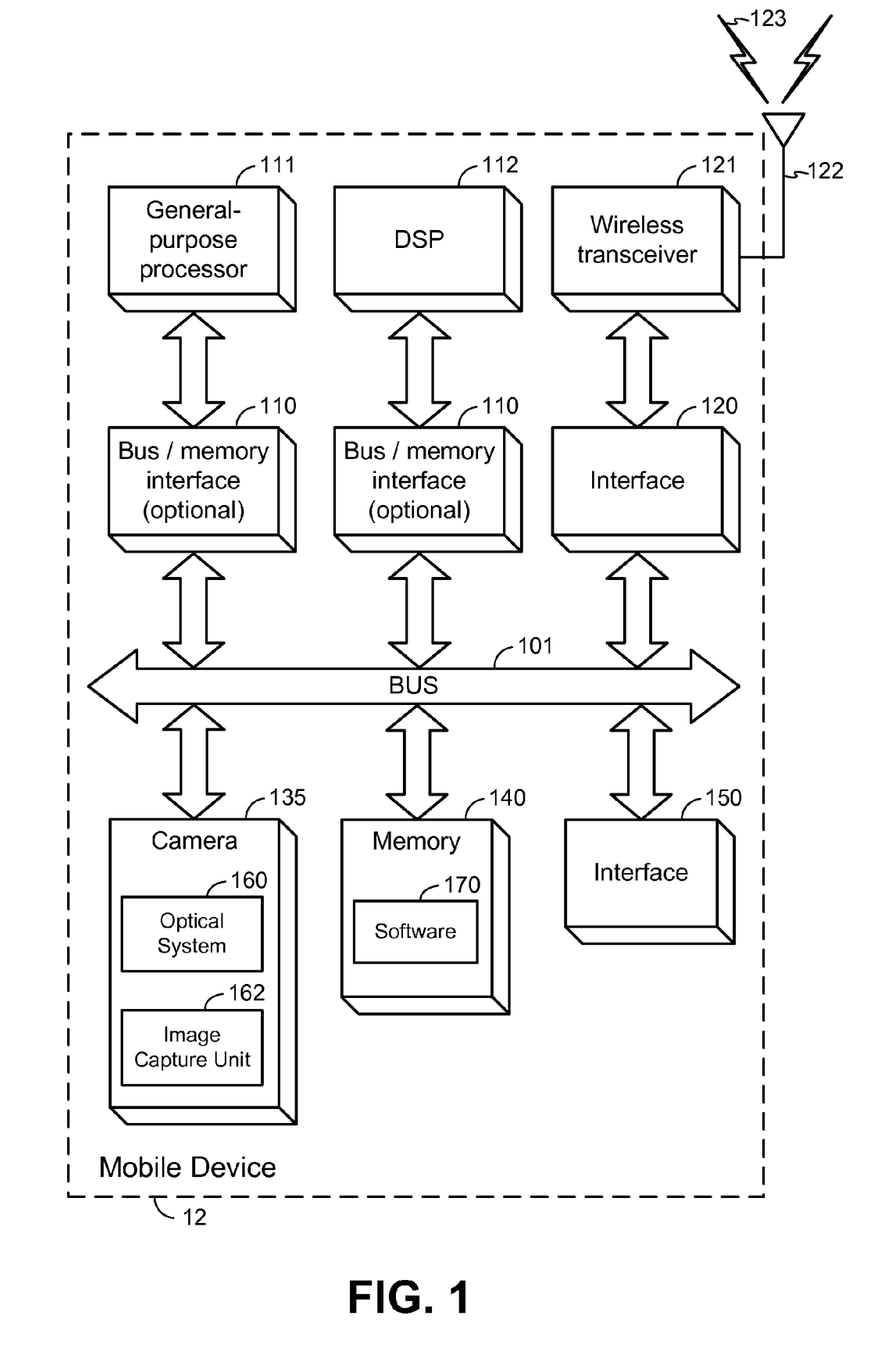
FIG. 1 is a block diagram of components of a mobile computing device.

Referring to FIG. 1, an example mobile device 12 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 12 is illustrated as having a single wireless transceiver 121. However, a mobile device 12 can alternatively have multiple wireless transceivers 121 and wireless antennas 122 to support multiple communication standards such as WiFi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 12. The general purpose processor 111 and DSP 112 are connected to the bus 101, either directly or by a bus interface 110. Additionally, the memory 140 is connected to the bus 101 either directly or by a bus interface (not shown). The bus interfaces 110, when implemented, can be integrated with or independent of the general-purpose processor 111, DSP 112 and/or memory 140 with which they are associated.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software 170 (programming code, instructions, etc.) configured to cause the processor 111 and/or DSP 112 to perform the functions described. Alternatively, one or more functions of the mobile device 12 may be performed in whole or in part in hardware.

The mobile device 12 further includes a camera 135 that captures images and/or video in the vicinity of the mobile device 12. The camera 135 includes an optical system 160 including one or more lenses, which collectively define a field of view of the camera 135 from which images are captured. Lenses and/or other components of the optical system 160 can be housed within the mobile device 12 and/or external to the mobile device 12, e.g., as lens attachments or the like. The optical system 160 is communicatively coupled with an image capturing unit 162. The image capturing unit 162 includes a charge-coupled device (CCD) and/or other technology to convert optical images into electrical information that is transferred to one or more processing entities of the mobile device 12, such as the general-purpose processor 111 and/or the DSP 112.

While the mobile device 12 here includes one camera 135, multiple cameras 135 could be used, such as a front-facing camera disposed along a front side of the mobile device 12 and a back-facing camera disposed along a back side of the mobile device 12, which can operate interdependently or independently of one another. The camera 135 is connected to the bus 101, either independently or through a bus interface 110. For instance, the camera 135 can communicate with the DSP 112 through the bus 101 in order to process images captured by the image capture unit 162 in the event that the camera 135 does not have an independent image processor. In addition, the camera 135 may be associated with other components, such as a microphone (not shown) for capturing audio associated with a given captured video segment. The camera 135 can additionally communicate with the general-purpose processor 111 and/or memory 140 to generate or otherwise obtain metadata associated with captured images or video. Metadata associated with, or linked to, an image contains information regarding various characteristics of the image. For instance, metadata includes a time, date and/or location at which an image is captured, image dimensions or resolution, an identity of the camera 135 and/or mobile device 12 used to capture the image, etc. Metadata utilized by the camera 135 are generated and/or stored in a suitable format, such as exchangeable image file format (EXIF) tags or the like. The camera 135 can also communicate with the wireless transceiver 121 to facilitate transmission of images or video captured by the camera 135 to one or more other entities within an associated communication network.

Figure 2:
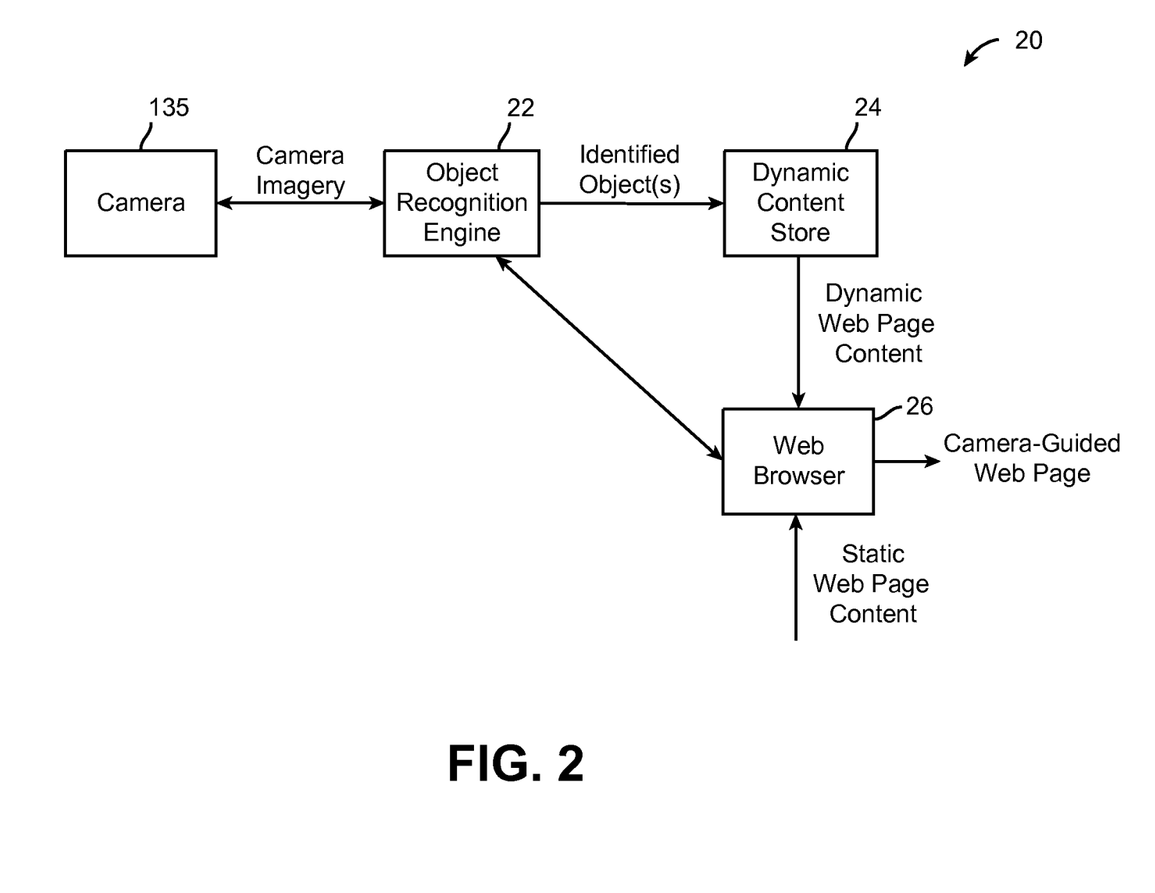
FIG. 2 is a block diagram of a system for operating a camera-guided web browser.

Referring next to FIG. 2, a system 20 for operating a camera-guided web browser 26 includes a camera 135, an object recognition engine 22, a dynamic content store 24 that operate in associated with the web browser 26. The camera 135, object recognition engine 22 and dynamic content store 24 operate as described below to provide an improved user experience associated with the web browser 26.

The camera 135, as illustrated in FIG. 1, is associated with a mobile device 12. In particular, the camera 135 is either housed within the mobile device 12 or communicatively coupled to the mobile device 12 with a wired connection such as Universal Serial Bus (USB), Firewire, or an audio/video connection such as a composite audio/video connection, a component (RGB or YPbPr) audio/video connection, High-Definition Multimedia Interface (HDMI) or the like, or a wireless connection such as Bluetooth, Wi-Fi, etc.

The camera 135 captures imagery of an area surrounding the camera 135 in a direction at which the camera 135 is pointed, e.g., by a user of the camera 135 or the mobile device 12. Imagery captured by the camera 135 is provided to the object recognition engine 22, which detects and identifies one or more objects within view of the camera 135. Here, the camera 135 and object recognition engine 22 operate to passively detect objects within the field of view of the camera 135. More particularly, the camera 135 is configured to passively and automatically capture images of the area corresponding to the field of view of the camera without manual input (or at least without repeated manual input, but possibly an initial manual input, e.g., a continuous mode capture initiation) from a user of the mobile device 12, and the object recognition engine 22 is similarly configured to identify objects within these images without active user input. The object recognition engine 22 is at least partially implemented by the mobile device 12, e.g., as a software component executed by a general purpose processor 111 and stored on a memory 140. The object recognition engine 22 can be implemented as part of the web browser 26, e.g., as a plug-in or module built in to the web browser 26, or it can be a stand-alone component associated with the mobile device 12. Implementation of the object recognition engine 22 within the web browser 26 is described in further detail below.

Additionally or alternatively, the object recognition engine 22 can communicate with one or more network entities (e.g., via the wireless transceiver 121), which at least partially implement the functionality of the object recognition engine 22. For instance, an object recognition engine 22 residing on a mobile device 12 can communicate with a network-based visual search service, a cloud computing service, etc., to assist in identifying objects in view of the camera 135. Here, the object recognition engine 22 leverages a database of known reference objects to identify objects within view of the camera 135 that sufficiently (i.e., within a threshold degree of confidence or similarity) match reference objects in the database. The database may be a local database stored at the mobile device 12 and managed by the object recognition engine 22, a network database stored at a remote entity and accessed by the object recognition engine 22, or a combination of a local database and a network database.

The object recognition engine 22 can continuously monitor the view of the camera 135 to attempt to detect objects within the view. Alternatively, to conserve computing and/or network resources, the object recognition engine 22 can intermittently sample images from the camera view. Sampling may be performed at a uniform rate, a non-uniform (random, variable or adaptive) rate, or upon satisfaction of certain triggering conditions (e.g., the view of the camera 135 is determined to have changed, etc.). To this end, the object recognition engine 22 may also assist in managing the power and/or operation status of the camera 135 by, e.g., placing the camera 135 in an active or powered on state when camera imagery is to be sampled and placing the camera 135 in an inactive or powered off state otherwise.

Here, the object recognition engine 22 provides computer vision detection and object recognition functionality for the mobile device 12. This functionality operate in a similar manner to detection mechanisms in augmented reality (AR) systems. For instance, in an AR system, detection is a computer vision process employed to identify known targets within a specific image. An entity performing detection is configured with a set of references or targets for which identification in a given image is attempted. The set of references consists of a set of points (or keypoints) represented with their two-dimensional position in an original reference image and a descriptor for each keypoint. Descriptors represent information relating to a corresponding keypoint, such as the gradient of the luminance information surrounding the keypoint. As an alternative, the reference image is itself stored and used as a template for detection. As a result of the detection process, point correspondences are produced from an identified reference image to the input image. Techniques are used, such as homography, to generate a pose representing the relationship between the two images. This pose information is subsequently utilized for additional operations, such as to initialize tracking of the newly detected object.

Upon detecting objects in view of the camera 135, content (text, audio, video, etc.) relating to the detected objects is retrieved from the dynamic content store 24 on direction from the object recognition engine 22 and presented to a user of the system 20 via the web browser 26. The web browser 26 facilitates navigation of information associated with one or more networks or internetworks, such as the internet. The web browser 26 enables navigation between different locations (e.g., websites or pages) using conventional input mechanisms, such as a touch screen or touchpad, numeric keypad, keyboard, mouse, etc. In addition, the web browser 26 directs the object recognition engine 22 to recognize and report objects within view of the camera 135 as discussed above. In doing so, the web browser 26 enables the camera 135 to guide the web browsing activity based on what is recognized from the view of the camera 135.

As further shown in FIG. 2, static content associated with a given location, such as a website or web page, is displayed along with dynamic content retrieved from the dynamic content store 24 that corresponds to object(s) detected by the object recognition engine 22. As the name implies, the dynamic content associated with the website is dynamically updated in response to changes in the objects visible by the camera 135. More particularly, upon detection an object within the field of view of the camera 135 by the object recognition engine 22, the web browser is configured to alter (e.g., replace or augment) at least part of the web page with content associated with the detected object. The addition of dynamic content results in a web page in which a portion of the content displayed on the page is continually changing based on objects in view of the camera 135, thereby enabling a user to receive context-specific information relative to objects currently being viewed without manual traversal of that information. Further, as the content of the web page is configured to change dynamically based on the view of the camera 135, a better, more intuitive user experience is provided, as the user can dynamically obtain relevant content without performing application-specific operations such as opening a dedicated application, locating or scanning a bar code or QR (quick response) code, performing manual inputs such as button presses, or manually directing the device 12 to another application or browser. Instead of the user clicking on links within a web page, the web browser 26 changes the contents of the web page based on what the device 12 is pointed towards, i.e., what the object recognition engine 22 recognizes from the imagery provided by the camera 135.

As shown in FIG. 2, the web browser 26 combines static web page content with dynamic web page content retrieved in response to detecting object(s) via the object recognition engine 22. Alternatively, a given web page may initially contain no static content, such that the web page does not actively display any information until dynamic content is retrieved in response to activating camera-guided browsing or detecting an object. In any case, static content may be retrieved and displayed in association with the web page at any time before, during or after retrieval and display of dynamic content in response to detection of objects.

To activate camera-guided browsing, the web browser 26 is either automatically or manually directed to a website or other location that supports the camera-guided browsing. This location may be a location on the internet or a smaller network or internetwork, such as a local intranet associated with a building or other venue, a walled garden and/or other provider-specific resources provided by an internet service provider (ISP) or network carrier, etc. Additionally, the capability of a given website to support camera-guided browsing can be indicated to a user of the web browser 26 so that the user can properly leverage this functionality of the website. For instance, upon navigating to a website that supports camera guiding functionality, the web browser 26 can provide an alert or other indication to the user that the website is "AR enabled" or otherwise capable of supporting guided browsing via the camera 135. Alternatively, this indication can be provided by the website itself. If a website having camera-guided browsing functionality is associated with a physical location, the address of the website, along with any other instructions for accessing the website (e.g., network credentials, login information, etc.), can also be given to users present at the physical location.

In addition to indicating the capability of a website to support camera-aided browsing, the web browser 26 and/or website can provide instructions to the user regarding the use of the camera 135 in navigating content associated with the website. This information can be given in any suitable manner, such as via help files or other documentation, interactive tutorials, etc. Additionally, the web browser 26 or website can provide feedback to the user while navigating the website to assist the user in accessing content associated with the site. For example, if no objects are detected within the view of the camera 135 at a given moment, the user can be provided with instructions regarding how to use the camera-aided browsing system 20. If objects are detected but are unclear (e.g., not discernible with at least a threshold degree of accuracy), the user can also be presented with suggestions for improving the image quality of the camera 135 to improve detection, such as steadying the camera 135, ensuring proper focus and lighting, etc.

Upon navigation of the web browser 26 to a supported location, the user directs the view of the camera 135 to various objects of interest. The web browser 26 directs the object recognition engine 22 to detect objects viewed by the camera 135 and to retrieve information about the detected objects via the dynamic content store 24, as described above. If multiple objects detected, information associated with the objects can be filtered and/or sorted prior to presentation at the web browser 26 in a variety of ways. For instance, detected objects can be weighted based on factors such as distance from the camera 135, object identification confidence, predetermined weighting criteria set by a content provider associated with the website and the dynamic content store 24, etc. Upon weighting the objects, the information corresponding to the objects is ordered and/or arranged such that information relating to the detected objects is placed within the dynamic web page content with varying degrees of visibility or prominence according to the weighting of the respective objects. Alternatively, the information can be filtered such that a single detected object or a limited subset of detected objects are selected for display within the dynamic web page content according to their weighting. For instance, the web browser 26 can be configured to only show information corresponding to a closest object, an object closest to a center of the camera view, or a highest weighted object based on other criteria. To this end, distance between the camera 135 and a given object may be calculated or estimated based on, e.g., the size of the object within the camera imagery, a zoom factor of the camera 135, orientation of the camera 135, known size of the object, etc.

As discussed above, the web browser 26 updates a web page to display information obtained from a dynamic content store 24 corresponding to passively detected objects. In contrast to conventional AR applications, the live camera imagery is not displayed but is instead used to control the objects for which information is displayed on the web page by the web browser. Additionally, while the dynamic content store 24 is illustrated in FIG. 2 as a single entity, multiple dynamic content stores 24 could be employed by the system 20. For instance, multiple dynamic content stores 24 could be employed, each corresponding to a particular website or group of websites. Additionally, the dynamic content store 24 for a given website can be implemented by a web server or other entity that also provides the web browser 26 with static content corresponding to the website.

Figure 3:
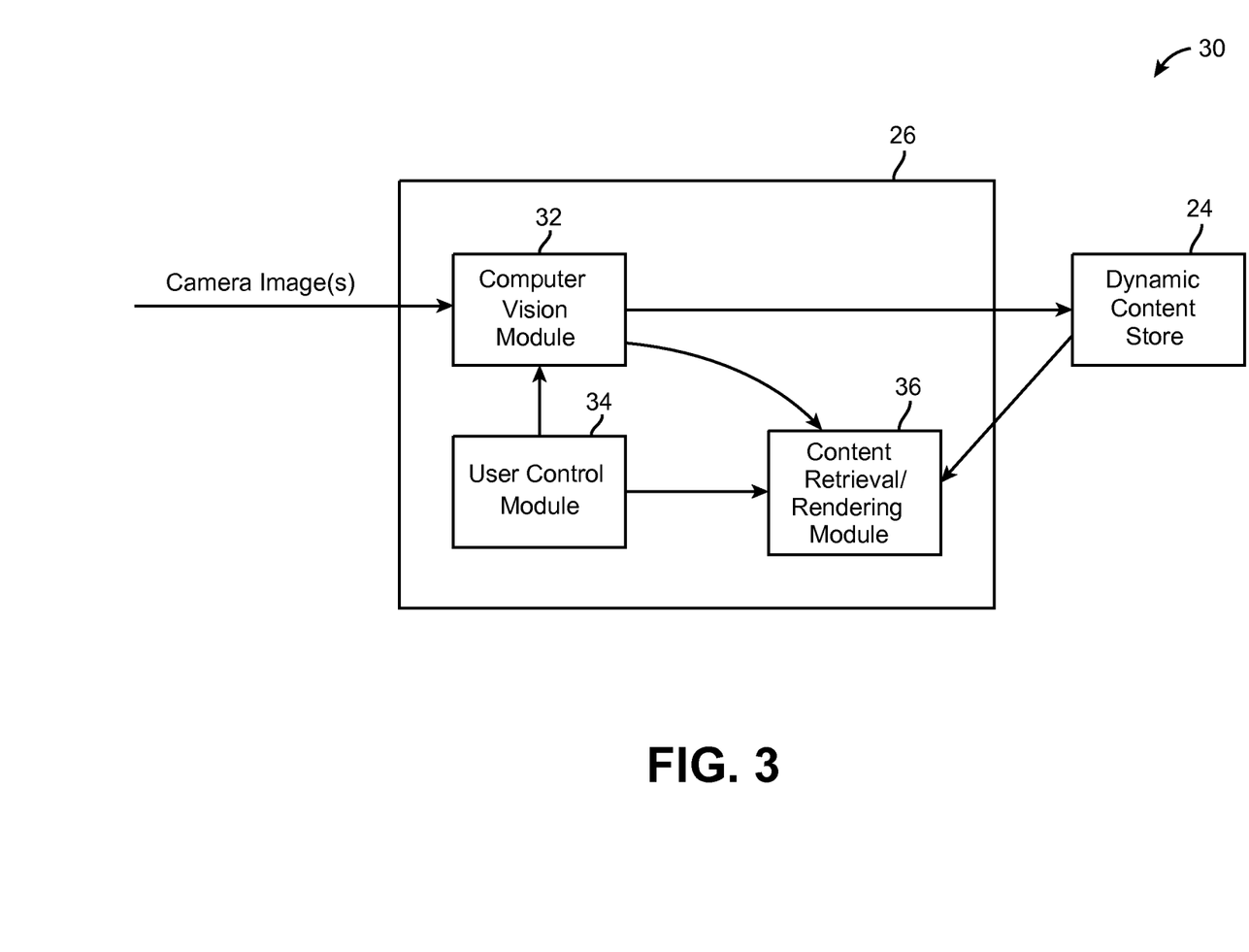
FIG. 3 is a block diagram of a system for implementing camera-guided browsing via a modular web browser.

Referring next to FIG. 3, a system 30 for implementing camera-guided browsing is illustrated in which the functionality of the object recognition engine 22 as described above is implemented within modules or plug-ins associated with a modular web browser 26. The web browser 26 incorporates computer vision detection and object recognition to enable web navigation with increased intuitiveness and ease of use. Here, computer vision and object recognition functionality is implemented by a computer vision module 32 associated with the web browser, which provides functionality similar to the object recognition engine 22 described above. Here, the computer vision module 32 is implemented within the web browser via a computer vision plug-in, or alternatively some or all computer vision and object recognition functionality of the web browser 26 could be built (or embedded) directly into the web browser 26, e.g., as one or more modular software components of the web browser 26. The browser capability provided by the computer vision module 32 enables a camera 135 associated with the web browser 26 to guide the web browsing activity within supported web locations based on what is recognized within the field of view of the camera 135.

Guided browsing is initiated by the system 30 in response to the web browser 26 being directed to a supported web page or other location. Navigation to this supported location may be the result of a manual action, such as a user action (e.g., clicking a link to the location, manually typing the address of the location, scanning a bar code or QR code indicative of the address of the location, etc.), or an automatic action (e.g., entering a geographic location associated with the web page, accessing a communication network associated with the web page, etc.). Here, the web browser 26 supports manual navigation via a user control module 34. Additionally, the user control module 34 can be used to enable or disable guided browsing functionality of the web browser 26, and/or to facilitate other user actions with respect to the web browser 26.

Content associated with web pages accessed by the web browser 26 is accessed and displayed by the web browser 26 via a content retrieval/rendering module 36. Within the context of a web page supporting guided browsing, at least part of the page is configured to change based on objects within the field of view of the camera 135. In other words, the contents displayed on a given page rendered by the web browser 26 via the content retrieval/rendering module 36, if the page is programmed to do so, are changed based on the objects that are detected by the computer vision module 32.

A web page supporting camera-guided browsing is implemented as a single web page having controls embedded therein that are configured to obtain information from the camera 135 via the computer vision module 32. These controls are implemented by code associated with the web page, which is given in any code language and/or protocol (e.g., JavaScript, Flash, HTML5, etc.) capable of being read and interpreted by the web browser 26.

Based on information provided by the computer vision module 32, the web page, via the web browser 26, passively (i.e., without direct user input) identifies objects of interest and loads content within the web page related to these objects. The content loaded by the web page is stored by a web server or other data storage entity. Here, the web page loads content related to the objects of interest from a dynamic content store 24, and the content loaded within the web page is obtained and displayed via the content retrieval/rendering module 36 of the web browser 26. While the dynamic content store 24 is illustrated in FIGS. 2-3 as a distinct entity, the dynamic content store 24 need not be a distinct data store and may instead be implemented as part of a web server or other entity that stores data including dynamic, context-specific content as well as static, generalized content for a supported web page or other network location.

Figure 4:
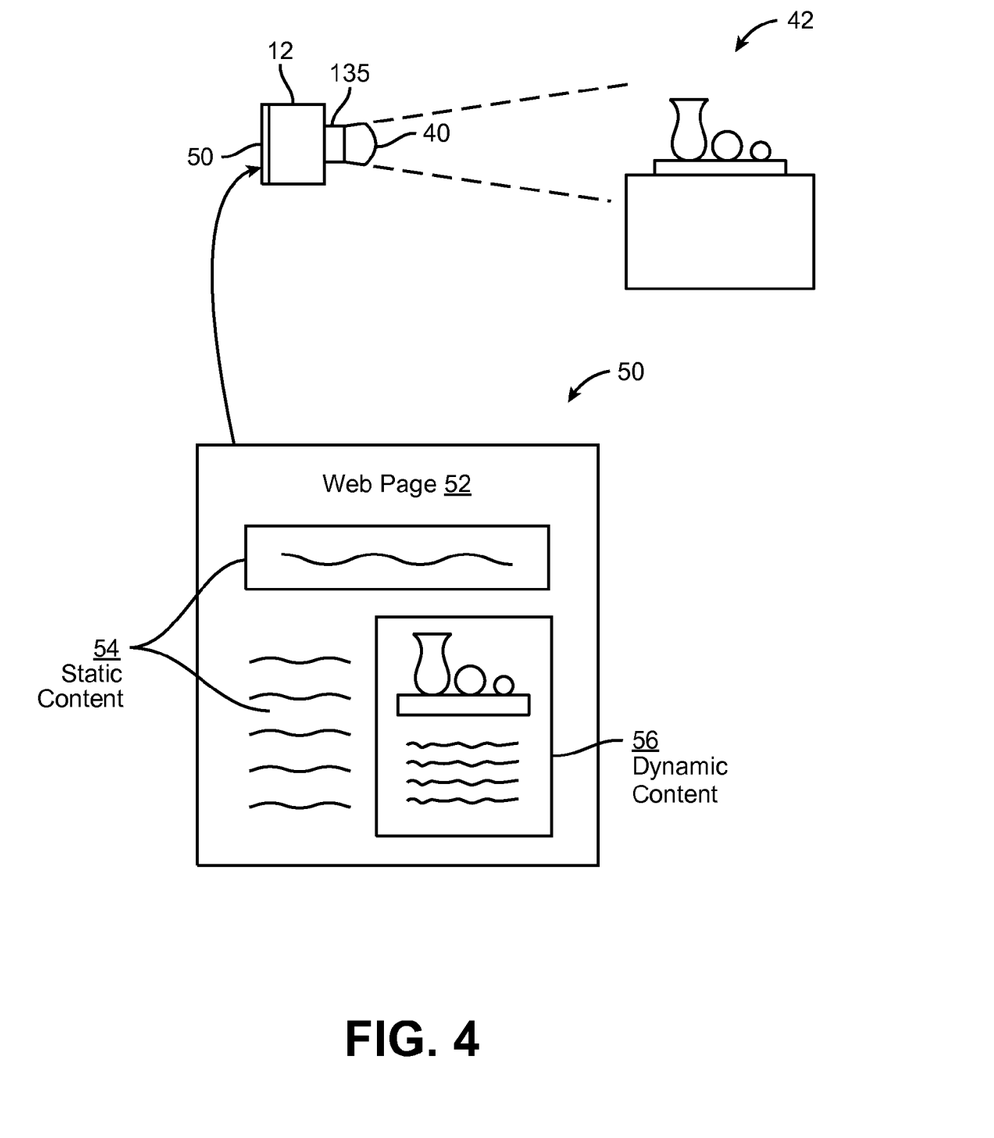
FIG. 4 is a diagram illustrating example operations of the systems of FIGS. 2 and 3.

An example of camera-guided operation of the web browser 26 is illustrated by FIG. 4. A mobile device 12 running the web browser 26 actively (e.g., by user input) or passively (e.g., by automatic action) directs the web browser 26 to an AR-supported web page 52. The web page 52 is displayed on a display screen 50 of the mobile device 12, disposed here on a back-facing surface of the mobile device 12. The web page 52 contains a combination of static content 54 and dynamic content 56. As the mobile device 12 is moved, an object recognition engine 22 (implemented within or distinct from the web browser 26) detects objects 42 within a field of view 40 of a camera 135 disposed within a front-facing surface of the mobile device 12. In response to changes in the objects 42 within the field of view 40 of the camera 135, the dynamic content 56 of the web page 52 is altered, preferably in real time or approximately real time with little if any delay, to provide context-specific information relating to the objects 42 in view. For instance, upon detecting a first object 42 within the field of view 40 of the camera 135, first content, comprising dynamic content 56 relating to the first object 42, is displayed in association with the web page 52. Subsequently, upon detecting a second object 42 within the field of view 40 of the camera 135, at least part of the web page 52 is altered with second content, comprising dynamic content 56 relating to the second object 42. This alteration can include either replacing the first content with the second content (e.g., if the second object 42 replaces the first object 42 in the field of view 40 of the camera 135) or displaying the second content in addition to the first content (e.g., if the second object 42 appears with the first object 42 within the field of view 40 of the camera 135). Other alterations are also possible.

Here, the dynamic content 56 is arranged within one or more distinct areas of the web page 52, such as frames of the web page 52 or other distinctly partitioned areas of the web page 52. However, the dynamic content 56 could be commingled with the static content 54 in any suitable manner or arrangement.

As an example implementation of the techniques shown in FIG. 4, a museum could offer an interactive mobile web page that provides a "guided tour" of an exhibit by configuring the web page to display information about object(s) in the exhibit at which a camera of a mobile device is pointed. For instance, upon visiting an art museum, a smartphone user navigates a web browser of the smartphone to an interactive mobile web page of the art museum. As the user browses the galleries of the art museum, the user points the smartphone at various paintings, photographs, or other exhibits. As the smartphone is pointed at new exhibits, the exhibits are detected as being within a field of view of a front-facing camera of the smartphone. In response, the content in the web browser of the smartphone is updated. As noted above, all content or a portion of the content (e.g., a frame or part of a frame, part of the page, etc.) could be changed.

Figure 5:
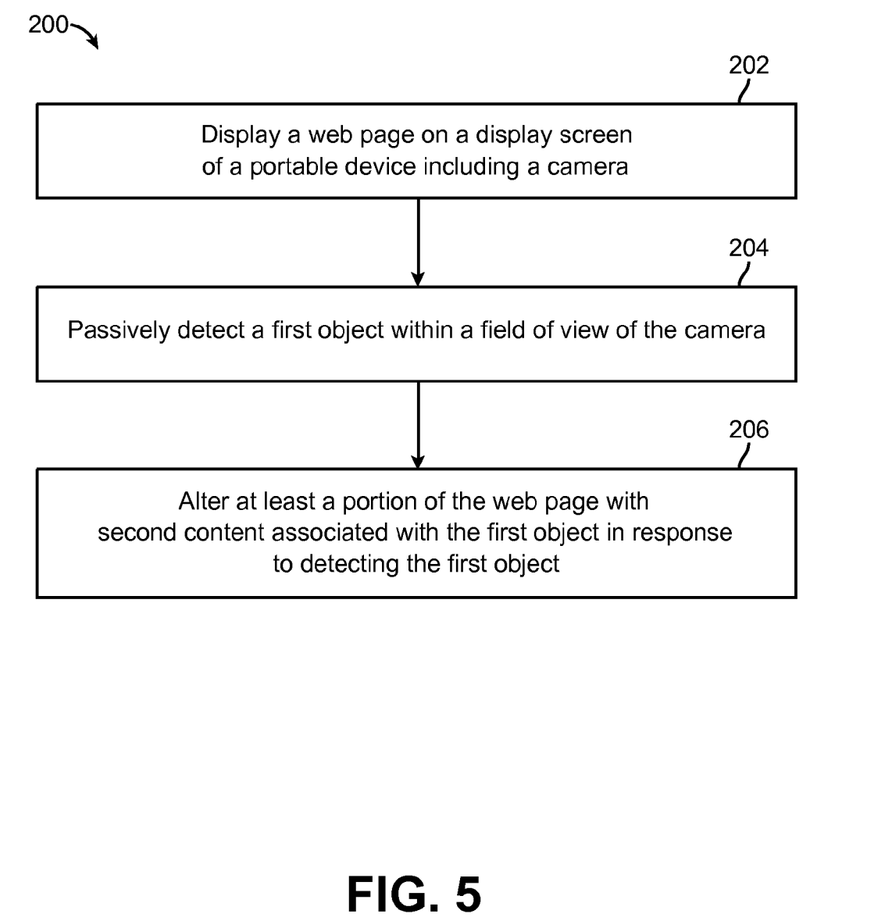
FIGS. 5-6 are block flow diagram of respective processes of providing a camera-guided web browsing experience.

Referring to FIG. 5, with further reference to FIGS. 1-4, a process 200 of providing a camera-guided web browsing experience includes the stages shown. The process 200 is, however, an example only and not limiting. The process 200 can be altered, e.g., by having stages added, removed, rearranged, combined, and/or performed concurrently. Still other alterations to the process 400 as shown and described are possible.

At stage 202, a web page 52 is displayed on a display screen 50 of a portable device 12 that includes a camera 135. Here, the web page 52 is displayed by a web browser 26, which is implemented by the general purpose processor 111 at the device 12 that executes software comprising processor-executable program code stored on the memory 140.

At stage 204, a first object 42 is passively detected within the field of view 40 of the camera 135. This detection is performed by an object recognition engine 22, which is implemented here by a computer vision module 32 and/or other components of the web browser 26. As discussed above, the passive detection performed at stage 204 can be performed by automatically capturing images via the camera 135 continuously or near continuously, periodically (e.g., according to a sample rate), based upon triggering events, a continuous mode selection/initiation, etc., and identifying the first object 42 within these images. However, in any case, the passive detection is performed without direct user input controlling the capture of images by the camera 135 or the detection of objects within the images. As described above, the passive detection performed at stage 204 can be initiated based on an indication that the web page 52 supports camera-guided browsing, e.g., by activating the camera 135 in response to receiving such an indication.

At stage 206, at least part of the web page 52, e.g., static content 54 and/or dynamic content 56, is altered with first content, including dynamic content 56 associated with the first object 42, in response to passively detecting the first object 42 at stage 204. Here, the dynamic content 56 is retrieved by a content retrieval/rendering module 36 of the web browser 26 from a dynamic content store 24. The dynamic content store 24 is implemented by a server that stores static content 54 and dynamic content 56 associated with the web page 52 and/or a distinct entity. Additionally, as noted above, the first content displayed within the web page 52 includes content that is distinct from imagery captured by the camera 135. The alteration performed at stage 206 can occur within the web page 52 as a whole, or alternatively the alteration can be limited to one or more sections of the web page 52, such as frames or the like, as discussed above.

In addition to the above, operations similar to those described at stages 204 and 206 may be performed and repeated for additional, subsequent objects 42 detected within the field of view 40 of the camera 135. For instance, upon altering the web page 52 with the first content associated with the first object 42, a second object 42 can be detected within the field of view 40 of the camera 135. In response to detecting this second object 42, at least part of the web page can be altered with second content associated with the second object 42. This alteration can be performed by replacing the first content with the second content, augmenting the first content with the second content, and/or other alterations sufficient to convey the second content to a user of the mobile device 12, as described above.

Figure 6:
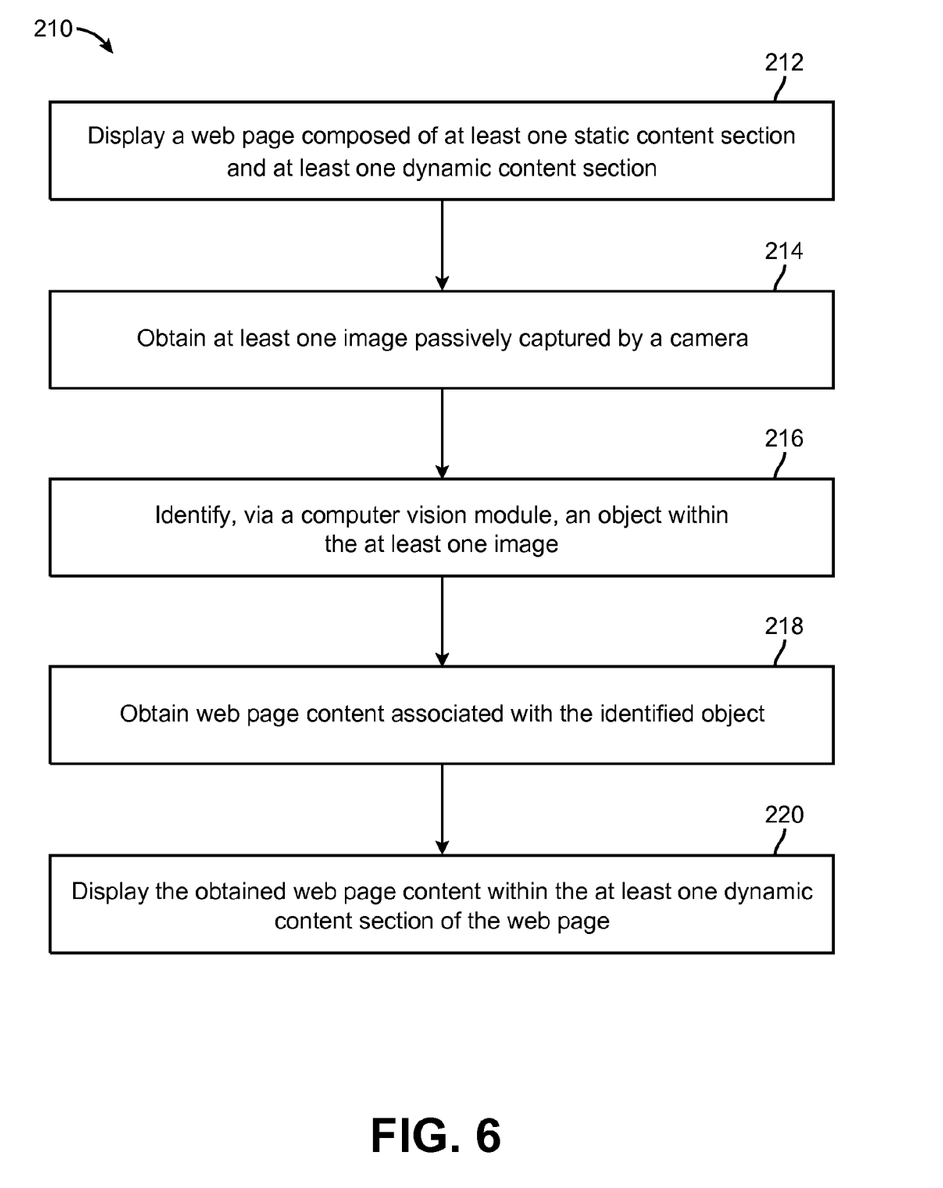

Referring to FIG. 6, with further reference to FIGS. 1-4, another process 210 of providing a camera-guided web browsing experience includes the stages shown. The process 210 is, however, an example only and not limiting. The process 210 can be altered, e.g., by having stages added, removed, rearranged, combined, and/or performed concurrently. Still other alterations to the process 210 as shown and described are possible.

At stage 212, a web page 52 composed of at least one static content section 54 and at least one dynamic content section 56 is displayed. Here, the web page 52 is displayed by a web browser 26 via a content retrieval/rendering module 36.

At stage 214, at least one image is passively, e.g., without user direction or direct user input, captured by a camera 135 disposed within or otherwise associated with a mobile device 12. At stage 216, an object 42 within the at least one image passively captured at stage 214 is identified using a computer vision module 32 associated with the web browser 26. As described above, the computer vision module 32 may be implemented as a plug-in or as embedded functionality of the web browser 26.

At stage 218, web page content associated with the object 42 identified at stage 216 is obtained, e.g., from a dynamic content store 24 or a server or storage entity associated with the web page 52. The content is obtained at stage 218 by the web browser 26 via the computer vision module 32 and/or the content retrieval/rendering module 36.

At stage 220, the content obtained at stage 218 is displayed by the content retrieval/rendering module 36 of the web browser 26 within the at least one dynamic content section 56 of the web page 52. The dynamic content section(s) 56 of the web page 52 can be frames within the web page 52 or partitioned sections of the web page 52 created in any manner interpretable by the web browser 26, such as via Cascading Style Sheets (CSS), Extensible Markup Language (XML) or the like.

Figure 7:
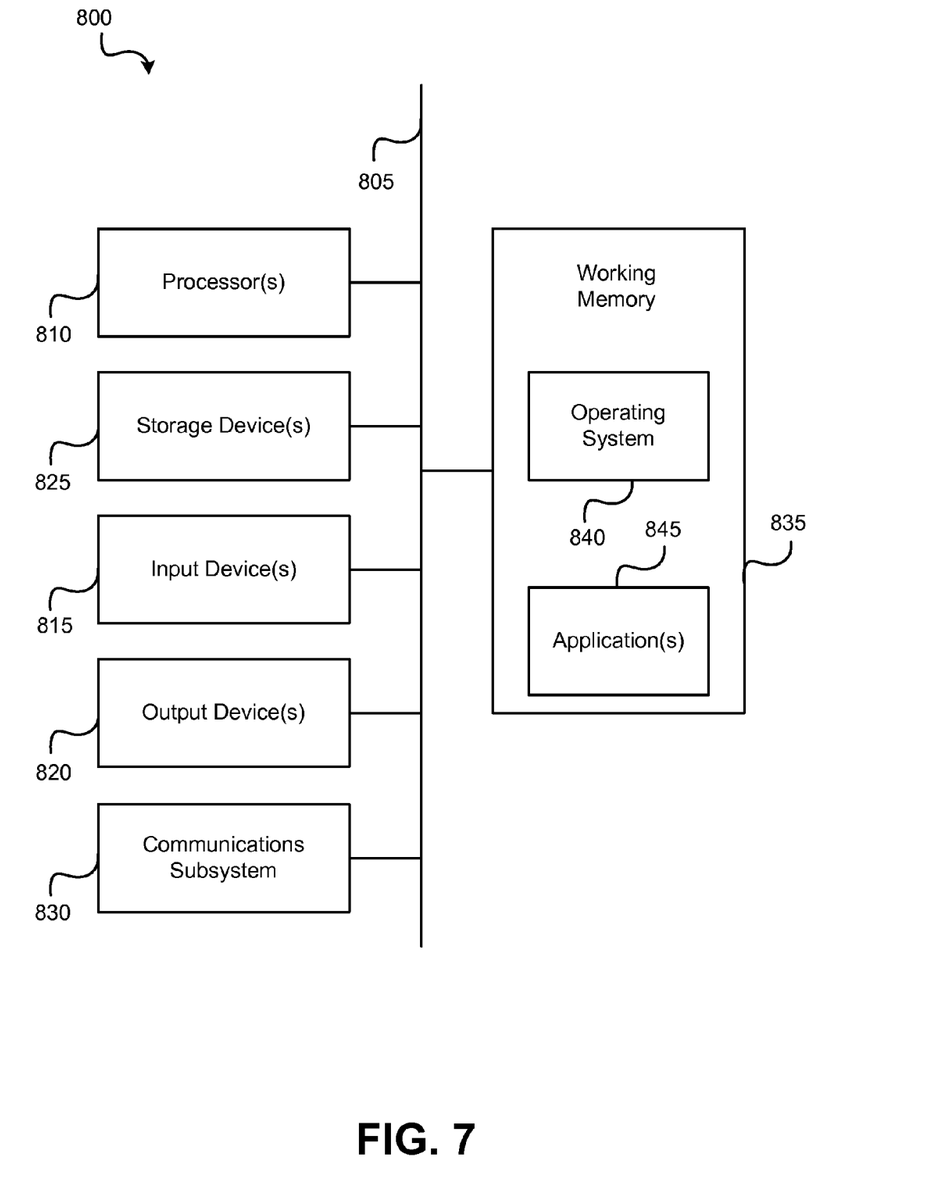
FIG. 7 is a block diagram of an example of a computer system.

A computer system 800 as illustrated in FIG. 7 may be utilized to at least partially implement the functionality of the previously described computerized devices. FIG. 7 provides a schematic illustration of one embodiment of a computer system 800 that can perform the methods provided by various other embodiments, as described herein, and/or can function as a mobile device or other computer system. FIG. 7 provides a generalized illustration of various components, any or all of which may be utilized as appropriate. FIG. 7, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard and/or the like; and one or more output devices 820, which can include without limitation a display device, a printer and/or the like. The processor(s) 810 can include, for example, intelligent hardware devices, e.g., a central processing unit (CPU) such as those made by Intel® Corporation or AMD®, a microcontroller, an ASIC, etc. Other processor types could also be utilized.

The computer system 800 may further include (and/or be in communication with) one or more non-transitory storage devices 825, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise, as here, a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more processes described herein might be implemented as code and/or instructions executable by a computer (and/or a processor within a computer). Such code and/or instructions can be used to configure and/or adapt a general purpose computer (or other device) to perform one or more operations in accordance with the described methods.

A set of these instructions and/or code might be stored on a computer-readable storage medium, such as the storage device(s) 825 described above. In some cases, the storage medium might be incorporated within a computer system, such as the system 800. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 800) may be used to perform methods in accordance with the disclosure. Some or all of the procedures of such methods may be performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 825. Volatile media include, without limitation, dynamic memory, such as the working memory 835. Transmission media include, without limitation, coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for operating a camera-guided web browser, the method comprising:
   displaying a web page on a display associated with a portable device, wherein the web page comprises content accessed over a network from a remote server and is defined by a markup language;
   receiving, from the web page, an indication that the web page supports camera-guided browsing;
   activating a camera associated with the portable device in response to receiving the indication;
   passively using an object recognition engine to detect a plurality of objects within a field of view of the camera associated with the portable device;
   weighting each of the plurality of objects based on the distance of each of the plurality of the objects from the camera to identify a first object, wherein weighting each of the plurality of objects comprises determining the relative size of each of the plurality of objects and identifying a largest object as the first object; and
   altering at least part of the web page with a first content associated with the first object.

2. The method of claim 1 wherein the first content comprises content distinct from imagery captured by the camera.

3. The method of claim 1 wherein the displaying comprises displaying the web page using a web browser application.

4. The method of claim 3 wherein the object recognition engine intermittently samples the field of view.

5. The method of claim 1 wherein the object recognition engine is implemented as a computer vision plug-in of the web browser application.

6. The method of claim 1 wherein the object recognition engine is implemented as an embedded component of the web browser application.

7. The method of claim 1 wherein the altering comprises altering one or more frames associated with the web page using the first content.

8. The method of claim 1 wherein:
   the displaying comprises displaying at least one static content section and at least one dynamic content section of the web page;
   weighting each of the plurality of objects comprises determining the relative distance of each of the plurality of objects, wherein an object closest to the camera is identified as the first object; and
   the altering comprises obtaining the first content, the first content comprising dynamic web page content associated with the first object, and displaying the first content within the at least one dynamic content section of the web page.

9. The method of claim 1 wherein receiving the indication that the web page supports camera-guided browsing includes providing an alert.

10. The method of claim 1 further comprising:
    weighting each of the plurality of object to identify the first object and a second object; and
    altering at least part of the web page with second content associated with the second object.

11. The method of claim 10 wherein the altering comprises replacing the first content with the second content.

12. The method of claim 10 wherein the altering comprises displaying the second content in addition to the first content.

13. The method of claim 1 wherein weighting each of the plurality of objects comprises determining a center object, wherein the center object is closest to a center of the field of view of the camera associated with the portable device, and the center objects is identified as the first object.

14. A system for operating a web browser, the system comprising:
a portable communications device having disposed therein a display screen and a camera, wherein the web browser is associated with the portable communications device and configured to display a web page on the display screen of the portable communications device and to receive an indication from the web page that the web page supports camera-guided browsing, wherein the web page comprises content accessed over a network from a remote server and is defined by a markup language;
an object recognition engine associated with the web browser, communicatively coupled to the camera, and configured to:
intermittently sample images within a field of view of the camera based on receiving an indication that the web page supports camera-guided browsing;
passively detect a plurality of objects within the images; and
weight each of the plurality of objects based on the distance of each of the plurality of the objects from the camera to identify a first object, wherein the object recognition engine is configured to determine the relative size of each of the plurality of objects and to identify a largest object as the first object;
wherein the web browser is further configured to alter at least part of the web page as displayed on the display screen with first content associated with the first object.

15. The system of claim 14 wherein the first content comprises content distinct from imagery captured by the camera.

16. The system of claim 14 wherein the object recognition engine comprises a plug-in of the web browser.

17. The system of claim 14 wherein the object recognition engine is an embedded component of the web browser.

18. The system of claim 14 wherein the web browser is configured to alter one or more frames associated with the web page with the first content.

19. The system of claim 14 wherein:
the web browser is configured to display at least one static content section and at least one dynamic content section of the web page on the display screen;
the object recognition engine is configured to instruct the camera to intermittently sample images within the field of view of the camera to passively and automatically capture at least one image and to detect the plurality of objects within the field of view and identify the first object within the at least one image; and
the web browser is further configured, in response to the object recognition engine, to obtain the first content, the first content comprising dynamic web page content associated with the first object, and to display the first content on the display screen within the at least one dynamic content section of the web page.

20. The system of claim 14 wherein:
the object recognition engine is further configured to weight each of the plurality of objects to identify the first object and a second object; and
the web browser is further configured to alter at least part of the web page with second content associated with the second object.

21. The system of claim 20 wherein the web browser is further configured to replace the first content with the second content.

22. The system of claim 20 wherein the web browser is further configured to display the second content in addition to the first content.

23. The system of claim 14 wherein the web browser is further configured to obtain an indication that the web page supports camera-guided browsing and to activate the camera in response to the indication.

24. The system of claim 14 wherein the portable communications device comprises a smartphone.

25. A system for operating a camera-guided web browser, the system comprising:
a portable device comprising a camera and a display screen;
static display means, communicatively coupled to the portable device, for displaying a web page at the display screen of the portable device, wherein the web page comprises content accessed over a network from a remote server and is defined by a markup language;
control means, communicatively coupled to the camera, for obtaining an indication, from the web page, that the web page supports camera-guided browsing and activating the camera in response to the indication;
computer vision means, communicatively coupled to the camera, configured to intermittently sample images within a field of view of the camera for passively detecting a plurality of objects within the images, and to weight each of the plurality of objects based on the distance of each of the plurality of the objects from the camera to identify a first object, wherein the computer vision means comprises means for determining the relative size of each of the plurality of objects and means for identifying a largest object as the first object; and
dynamic display means, communicatively coupled to the static display means and the computer vision means, for altering at least part of the web page with first content associated with the first object.

26. The system of claim 25 wherein the first content comprises content distinct from imagery captured by the camera.

27. The system of claim 25 wherein the dynamic display means comprises means for altering one or more frames associated with the web page using the first content.

28. The system of claim 25 wherein:
the static display means comprises means for partitioning the web page into one static content section and at least one dynamic content section;
the computer vision means comprises means for weighting each of the plurality based on a relative distance of each of the plurality of objects, wherein the closest object is identified as the first object; and
the dynamic display means comprises means for obtaining the first content, the first content comprising dynamic web page content associated with the first object, and means for displaying the first content within the at least one dynamic content section of the web page.

29. The system of claim 25 wherein:
the computer vision means comprises means for weighting each of the plurality of objects to identify the first object and a second object; and
the dynamic display means comprises means for altering at least part of the web page with second content associated with the second object.

30. A computer program product residing on a processor-executable non-transitory computer-readable storage medium, the computer program product comprising processor-executable instructions configured to cause a processor to:
- display a web page on a display screen associated with a portable device, wherein the web page comprises content accessed over a network from a remote server and is defined by a markup language;
- receive, from the web page, an indication that the web page supports camera-guided browsing;
- activate a camera associated with the portable device in response to receiving the indication;
- passively execute an object recognition engine to detect a plurality of objects within a field of view of the camera associated with the portable device;
- weight each of the plurality of objects based on the distance of each of the plurality of the objects from the camera to identify a first object, wherein the instructions configured to cause the processor to weight each of the plurality of objects comprise instructions configured to cause the processor to determine the relative size of each of the plurality of objects and to identify a largest object as the first object; and
- alter at least part of the web page with first content associated with the first object.

31. The computer program product of claim 30 wherein the first content comprises content distinct from imagery captured by the camera.

32. The computer program product of claim 30 wherein the instructions configured to cause the processor to alter at least part of the web page comprise instructions configured to cause the processor to alter content within one or more frames associated with the web page.

33. The computer program product of claim 30 wherein:
- the computer program product further comprises instructions configured to cause the processor to display at least one static content section and at least one dynamic content section of the web page;
- the instructions configured to cause the processor to passively execute the object recognition engine to detect the plurality of objects comprise instructions configured to cause the processor to:
    - passively and automatically capture at least one image using the camera, and
    - identify the plurality of objects within the at least one image; and
    - weight each of the plurality of objects to identify the first object; and
- the instructions configured to cause the processor to alter at least part of the web page comprise instructions configured to cause the processor to:
    - obtain the first content, the first content comprising dynamic web page content associated with the first object, and
    - display the first content within the at least one dynamic content section of the web page.

34. The computer program product of claim 30 further comprising processor-executable instructions configured to cause the processor to display an alert in response to receiving the indication that the web page supports camera-guided browsing.

35. The computer program product of claim 30 further comprising processor-executable instructions configured to cause the processor to:
- weight each of the plurality of objects to identify the first object and a second object; and
- alter at least part of the web page with second content associated with the second object.

* * * * *